March 17, 1959 F. J. MARKEY 2,877,786
SHIELDED WEB EDGE DETECTOR
Filed April 3, 1956
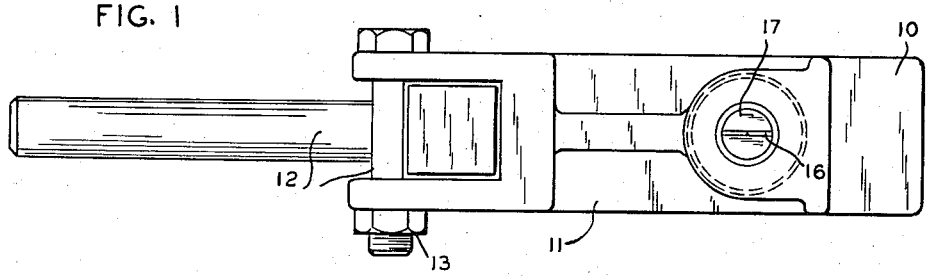
FIG. 1
FIG. 3
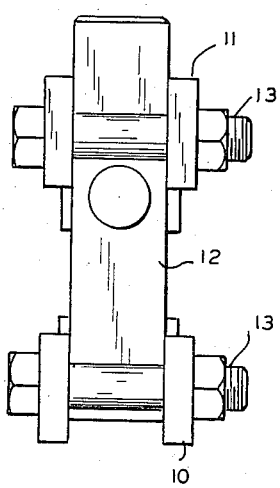
FIG. 2
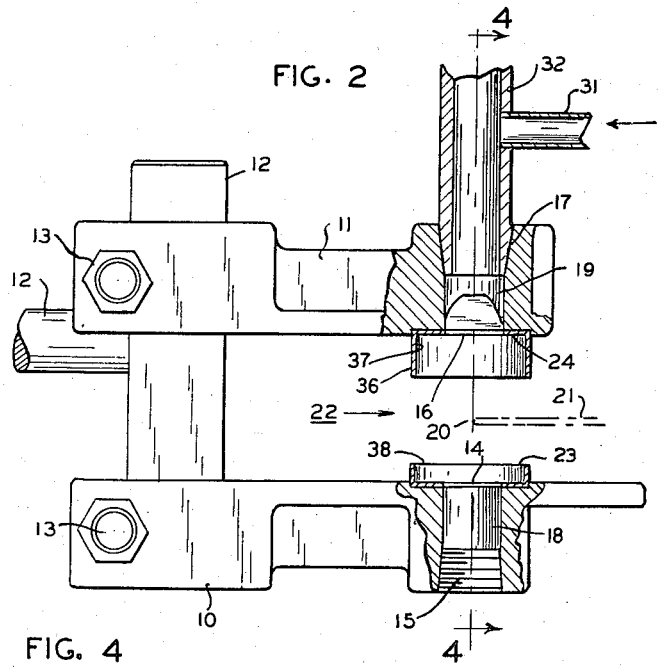
FIG. 4
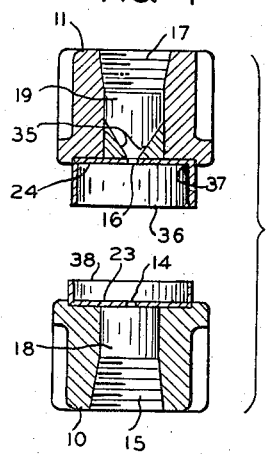
INVENTOR.
FRANK J. MARKEY
BY
ATTORNEYS

United States Patent Office 2,877,786
Patented Mar. 17, 1959

2,877,786

SHIELDED WEB EDGE DETECTOR

Frank J. Markey, Hammond, Ind., assignor to Askania Regulator Company, Chicago, Ill., a corporation of Illinois Application April 3, 1956, Serial No. 575,807

5 Claims. (Cl. 137—83)

The present invention relates to the detection of the lateral position of a traveling web of material, accomplished by means of a detector device in which a jet of air is transmitted from a delivery port to a receiver port, between which is interposed a marginal portion of a body the lateral position of an edge of which is to be sensed. A pressure is developed in the receiver port, the magnitude of which varies in response to changes in the lateral position of the body edge and the portions of the jet that respectively are intercepted by the body and delivered past its edge to the receiver port. More particularly, the invention is directed to improvement of the structure of the detector device, and specifically to provision of means for prevention of upset of its characteristic of response due to deposit of semi-fluid, pasty and such materials that in certain fields of service are thrown off by webs subjected to guide control while traveling longitudinally.

A system commonly employed with the detector device includes a relay regulating signal pressure translating device connected with the detector by means of a signal pipe, the translating device being in the form of an expansible chamber motor or force balance assembly, generally of the flexible bellows type. It has been found that such a signal system operates most efficiently by being positively pressurized by the continuous introduction into the system at a convenient location of pressurizing fluid, most conveniently the same fluid used to form the detecting stream. One result of the pressurized system is the continuous discharge of a stream of air from the receiver port, in a counterflow to the detecting stream. Under certain types of service, where the detection of the edge position of web materials such as textiles and papers is required, foreign material such as lint and the like is present in a loose condition near the detector. Due to the stream of air flowing from the delivery port, whenever such foreign material is present it gathers in and around the receiver port and even, under some circumstances, about the delivery orifice. Any accumulation in and about either opening tends to clog the openings, resulting in impairment of the response characteristic of the system. Providing a counterflow of purging fluid through the signal pipe and discharging it from the receiver port, has proven highly effective in preventing such accumulations.

Provision of a purging flow of fluid pressure from the receiver port will not prevent deposit about and in the receiver port of semi-fluid, gummy substances such as latex and glue that may be spattered by the web. To overcome this situation, in accordance with the present invention, a shielding flange is arranged external to the receiver structure and surrounding the receiver port. Such flange not only shields the port-forming surfaces of the receiver from heavy flying gobs of material, but additionally, and particularly when combined with receiver purging, sets up within its confines a turbulence of air in the nature of eddy currents, which tends to carry to and lodge in the peripheral corner formed by the external flange surface and the detector surfaces, any such material present, thus tending to keep the port and orifice areas free of the foreign matter. Similar protection of the jet-forming discharge orifice may be additionally employed to prevent deposit or accumulation tending to distort the jet. By such provisions efficiency of operating the detector system, is greatly increased, there being a minimum of time when the operation is halted for the purpose of cleaning the delivery orifice and the receiver port and also by there being a maximal time during which the sensitivity characteristic of the signal is retained at its peak.

In the accompanying drawings:

Fig. 1 is a plan view of a detector device embodying the present invention;

Fig. 2 is a side elevational view of the device in Fig. 1, partly in section in the fluid delivery and receiver areas;

Fig. 3 is an end elevational view; and

Fig. 4 is a vertical sectional view taken as indicated by the lines and arrows shown in Fig. 2.

Referring now to the drawings, a detector device commonly termed a sensing nozzle is shown including a pair of support arms 10 and 11, each attached to a T-shaped support bar 12 by means of nut and bolt devices 13 whereby the arms may be independently moved longitudinally of the bar 12 for such spacing as is necessary for the effectiveness of the signal means.

The signal means comprises a delivery orifice 14 at the upper end of a cylindrical bore 15 formed in the outer end of the lower support arm 10 and a receiver port at the lower end of a cylindrical bore 17 formed in the outer end of the upper support arm 11, whereby the axes of the bores are in direct alignment.

By the delivery of fluid under pressure to the delivery chamber 18, a stream of fluid is caused to emit through the delivery orifice 14 toward the receiver port 16, thus causing a pressure to develop in the receiving chamber 19, the pressure depending upon the degree of interception of the jet stream by the web 21. Upon the interception of the stream by the marginal edge 20 of the web 21 passing through the throat 22 formed between the arms, it may readily be appreciated that the pressure in chamber 19 will gradually drop as the edge 20 moves further into the stream. By transmitting this pressure to a signal pressure translating device (not shown), for example, of the flexible bellows type, the varying pressure build-up may be utilized by relay regulator means (not shown) to control the lateral position of the web edge 20.

In order that a proper range is provided to measure the position of the edge 20 and to provide a linearly responsive variation of signal pressure developed in chamber 19, the discharge orifice 14 and the receiver port 16 are elongated slots extending transverse to the edge 20 of the web 21 and formed in cover plates 23 and 24, the latter being secured to the arms 10 and 11 respectively in a manner to extend respectively across the facing ends of the different cylindrical bores 15, 17.

As noted hereinbefore, when various types of web material, such as paper and textile material, are being passed through the throat 22 at varying velocities, there is a quantity, over a period of time, of loose material such as lint and other foreign matter thrown and splattered in and about both the delivery orifice 14 and the receiver port 16. Due to the stream of air passing from the delivery orifice 14 to the receiver port 16, a greater quantity of foreign matter tends to gather at the receiver port than at the delivery orifice. As such foreign matter tends to clog up the openings, and thus materially reduce the sensitivity of the signal system it is imperative that means be devised to eliminate as much of such accumulation as is possible.

One means toward this end is the provision of a supply of purging fluid supplied to the system between the receiver port 16 and the translating device whereby the purging fluid is forced out the receiver port thereby tending to purge any accumulation of foreign matter within the receiver chamber 19 and further to prevent gathering of the foreign matter in and about the port 16 itself. In the present embodiment, such a purging arrangement is accomplished, as disclosed and claimed in my co-pending application for United States patent, Serial No. 529,737, now Patent No. 2,794,444, dated June 4, 1957, by a supply pipe 31 to which a regulated flow of air is supplied and which is connected to signal pipe 32 by which signal pressure is transmitted to a point of utilization and which is connected to the receiver chamber 19.

Whereas the purging arrangement provides a definite improvement in preventing the undesirable accumulation of foreign matter in and about receiver port 16 and the chamber 19, the chamber 19 having shoulders 35 tapering from the walls thereof to the port 16 so as to eliminate right angular material-catching corners, the tendency of such detectors toward the undesirable accumulation has not been entirely eliminated, particularly where the web 21 contains or carries loose gummy fluid or semi-fluid substances which tend to splatter against the area adjacent to the port 16 and the delivery orifice 14.

For this reason, according to the invention a circular wall or shield 36 extending around the periphery of the cover plate 24 at points equi-distant from the port 16, and attached to and depending at substantially right angles from the arm 11 is provided, whereby port 16 is somewhat protected and foreign matter tends to gather around the inside corner 37 formed by the shield 36 and the plate 23 rather than in the port 16 or on surfaces immediately surrounding it. The tendency for the foreign matter to gather in the corner 37 may be caused by the circular nature of the shield, as it may be readily appreciated that merely the passage through the throat 21 of the web 20 results in the setting up of air currents, which upon striking the inside of a shield form eddy currents around the circumference of the shield. The shield in no way interferes with the recovery of the jet stream, in fact, its reflow from the port area also tends to eddy within the shield, tending to prevent entry of and to carry away foreign matter.

A like shield or walled enclosure 38 may be similarly secured to the lower arm 10 to aid in preventing the accumulation of foreign matter in and about the delivery orifice 14, however, the depth of the lower shield 38 may be less than that of the upper shield 36 as a foreign matter tends to accumulate more in the area of the latter, due to the tendency of the jet stream emitted from the delivery orifice 14 to carry it away or deflect it.

By providing the circular shields 36 and 38 which circumscribe the delivery orifice 14 and the receiver port 16, thereby reducing appreciably the accumulation of foreign matter in and about such openings, the response characteristic of the signal system is maintained for periods of time much longer than that presently available even under severe conditions, thus that in certain situations heretofore have rendered use of our jet web detectors completely impractical.

Although the specific embodiment described and depicted herein may be preferred, it is understood that various changes and modifications thereof may be resorted to without departing from the spirit and scope of the invention as defined by the appended claims.

I claim:

1. Shield means for a device for detecting the lateral position of an edge of a body, and including a pair of structural members spaced apart to provide between facing surfaces thereof a throat for entry of the marginal portion of such body, one of said members having an opening in said surface constituting an orifice for discharging a stream of fluid across said throat and the other having a second opening opposed to the first said opening and constituting a receiver port for reception of a portion of the stream passed by the body edge, said shield means comprising a wall member surrounding one of said openings laterally spaced and attached to the said surface of the member having that opening.

2. Shield means according to claim 1, including a second open ended shielding wall member secured to the other of said opposed surfaces and spaced from and surrounding said opening in the latter, the adjacent arms of said shield members being spaced for clearance of said body.

3. Shield means according to claim 1, wherein said shield member surrounds said discharge orifice opening.

4. Shield means according to claim 1, wherein said shield member surrounds said receiver port opening.

5. The combination with a jet type edge position detector that includes means for directing past the edge of which the position is to be detected, structure having a surface provided with an internal chamber having a receiver port positioned to receive a portion of a jet discharge by said means past said edge, for development within said chamber of a pressure the magnitude of which varies with change of position of said edge, and means for introducing into said chamber a current of purging fluid for discharge through said port, of a ring-like shielding wall member attached to said structure and surrounding and spaced from said receiver port.

References Cited in the file of this patent
UNITED STATES PATENTS
2,397,448   Todd ------------------ Mar. 26, 1946